(12) United States Patent
Zhang et al.

(10) Patent No.: US 12,130,786 B2
(45) Date of Patent: Oct. 29, 2024

(54) STRUCTURED DATA ANALYSIS SYSTEM AND METHOD FOR STRUCTURED DATA ANALYSIS

(71) Applicants: Digiwin Software Co., Ltd, Shanghai (CN); DATA SYSTEMS CONSULTING CO., LTD., New Taipei (TW)

(72) Inventors: Jun Zhang, Shanghai (CN); Lei Feng, Shanghai (CN); Guoxin Sun, Shanghai (CN)

(73) Assignees: Digiwin Software Co., Ltd, Shanghai (CN); DATA SYSTEMS CONSULTING CO., LTD., New Taipei (TW)

( * ) Notice: Subject to any disclaimer, the term of this patent is extended or adjusted under 35 U.S.C. 154(b) by 0 days.

(21) Appl. No.: 18/306,991

(22) Filed: Apr. 25, 2023

(65) Prior Publication Data

US 2024/0281418 A1      Aug. 22, 2024

(30) Foreign Application Priority Data

Feb. 21, 2023   (CN) .......................... 202310148413.3

(51) Int. Cl.
*G06F 16/215*   (2019.01)
*G06F 16/22*    (2019.01)
*G06F 16/25*    (2019.01)

(52) U.S. Cl.
CPC ........ *G06F 16/215* (2019.01); *G06F 16/2246* (2019.01); *G06F 16/258* (2019.01)

(58) Field of Classification Search
None
See application file for complete search history.

(56) References Cited

U.S. PATENT DOCUMENTS

2022/0095079 A1* 3/2022 Volkerink ............. H04W 4/029

\* cited by examiner

*Primary Examiner* — Baoquoc N To
(74) *Attorney, Agent, or Firm* — JCIPRNET

(57) ABSTRACT

A structured data analysis system and a method for structured data analysis are provided. The structured data analysis system includes a memory and a processor. The processor obtains input data from an electronic device and converts the same into tree structure data to form nodes. The processor selects a first and a second node among the nodes. The first and the second nodes respectively correspond to a first and a second collection among the collections in the input data. The processor generates missing judgment result by judging whether the first node is missing according to a first amount of the first collection and a second amount of elements included in the second collection. The processor judges that whether the processor generates output data to the server based on original field data according to the missing judgment result to enable the server to operate correctly according to the completed output data.

20 Claims, 9 Drawing Sheets

```
{
640 ─  "simp":"002",
       "col1":[
         {
           "simp2":"203",
           "cpx2":{
650 ─        "simp3":"303"
           },
           "col2":{
             {
               "simp4":"404"
             }
           ]
         },
         {
           "simp2":"204",
           "cpx2":{
             "simp3":"304"
           },
           "col2":{
             {
               "simp4":"405"
             },
             {
               "simp4":"406"
             }
           ]
         }
       ]
},
```

FIG. 6B

```
{
  660 ─ "simp":"003",
      "col1":[
          {
              "simp2":"205",
              "cpx2":{
  670 ─         "simp3":"305"
              },
              "col2":{
                  {
                      "simp4":"407"
                  }
              ]
          },
          {
              "simp2":"206",
              "cpx2":{
                  "simp3":"306"
              },
              "col2":{
                  {
                      "simp4":"408"
                  },
                  {
                      "simp4":"409"
                  }
              ]
          }
      ],
      "tenantId":"athenaTestW"
}
```

FIG. 6C

STRUCTURED DATA ANALYSIS SYSTEM AND METHOD FOR STRUCTURED DATA ANALYSIS

CROSS-REFERENCE TO RELATED APPLICATION

This application claims the priority benefit of China application serial no. 202310148413.3, filed on Feb. 21, 2023. The entirety of the above-mentioned patent application is hereby incorporated by reference herein and made a part of this specification.

BACKGROUND

Technical Field

The disclosure relates to an analysis system, and more particularly to a structured data analysis system and method for structured data analysis.

Description of Related Art

Generally, an enterprise system may use system data to execute various tasks through an application programming interface (API) call. In some cases, when the enterprise system executes a new task, the current system data lacks the element for executing the new task. In light of this, the enterprise system needs to update the system data, so that the API call may be continued according to the updated system data. In other cases, when some fields of the system data such as calls or requests corresponding to the new task are missing, the enterprise system is not informed of the aforementioned missing conditions, resulting in an error when the enterprise system executes the API call.

SUMMARY

The disclosure is related to a structured data analysis system capable of analyzing and processing missing fields in input data, so that the server may correctly perform corresponding operations based on the completed input data.

According to the embodiment of the disclosure, the structured data analysis system of the disclosure includes a memory and a processor. The memory is configured to store original field data. The processor is coupled to the memory and the server. The processor is configured to obtain input data from an electronic device and configured to convert the input data into tree structure data to form multiple nodes. The nodes correspond to multiple collections in the input data, respectively. The processor is further configured to select a first node and a second node among the nodes. The first node and the second node respectively correspond to a first collection and a second collection among the collections. The processor is further configured to generate a missing judgment result by judging whether the first node is missing according to a first amount of the first collection and a second amount of elements included in the second collection. The processor is further configured to judge whether the processor generates output data to the server based on the original field data according to the missing judgment result to enable the server to operate according to the output data.

According to the embodiment of the disclosure, the method for structured data analysis of the disclosure includes the following processes. Through a processor of a server, input data is obtained from an electronic device. Through the processor, the input data is converted into tree structure data to form multiple nodes. The nodes correspond to multiple collections in the input data, respectively. Through the processor, a first node and a second node are selected among the nodes. The first node and the second node respectively correspond to a first collection and a second collection among the collections. Through the processor, a missing judgment result is generated by judging whether the first node is missing according to a first amount of the first collection and a second amount of elements included in the second collection. Through the processor, it is judged that whether the processor generates output data to the server based on original field data according to the missing judgment result to enable the server to operate according to the output data.

Based on the above, the structured data analysis system and the method for structured data analysis of the disclosure may convert input data into tree structure data and may analyze multiple nodes in the tree structure data to judge the missing judgment result of the node. Accordingly, the structured data analysis system may automatically analyze the missing fields in the input data and may perform completion based on the original field data to generate output data, so that the server may correctly perform corresponding operations based on the output data.

In order to make the aforementioned features and advantages of the disclosure comprehensible, embodiments accompanied with drawings are described in detail below.

BRIEF DESCRIPTION OF THE DRAWINGS

FIG. 6A to FIG. 6C are schematic diagrams of input data according to the embodiment of FIG. 4 of the disclosure.

DESCRIPTION OF THE EMBODIMENTS

Figure 1:
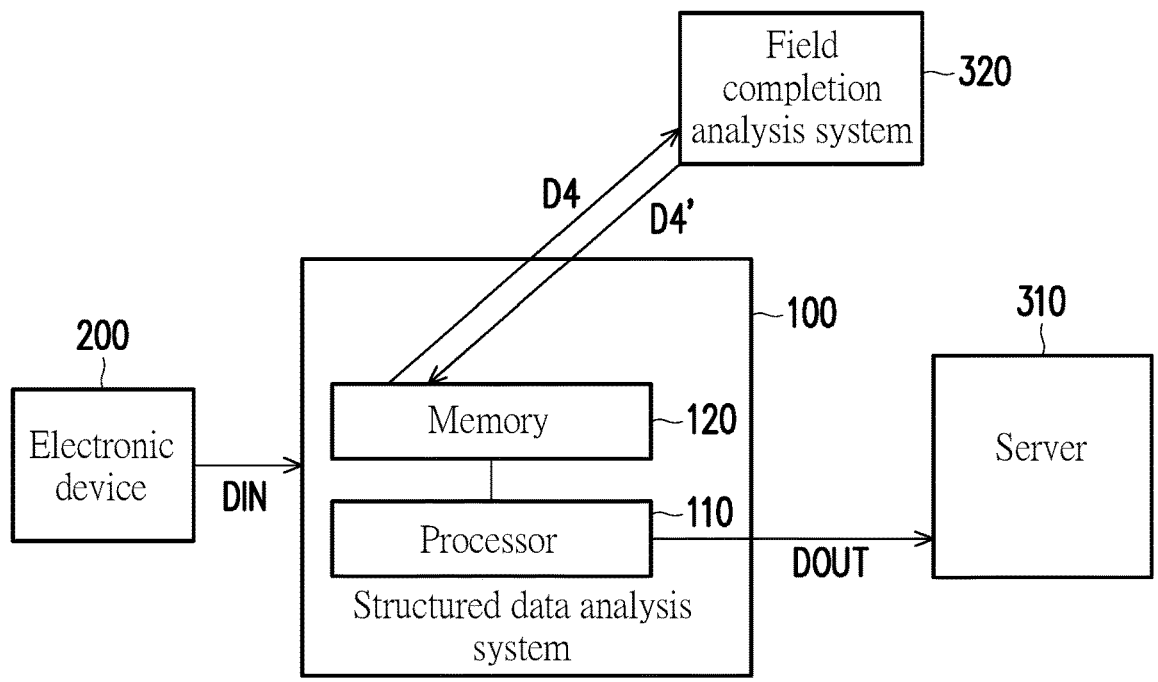
FIG. 1 is a circuit block diagram of a structured data analysis system according to an embodiment of the disclosure.

Reference will now be made in detail to the exemplary embodiments of the disclosure, and examples of the exemplary embodiments are illustrated in the accompanying drawings. Whenever possible, the same reference numerals are used in the drawings and the description to indicate the same or similar parts.

FIG. 1 is a circuit block diagram of a structured data analysis system according to an embodiment of the disclosure. Referring to FIG. 1, a structured data analysis system 100 is coupled to an electronic device 200, a server 310, and a field completion analysis system 320. In this embodiment, the electronic device 200 executes an enterprise system to perform various tasks through the enterprise system. The enterprise system may be, for example, an enterprise resource planning (ERP) system. The electronic device 200 may operate in harmony with the structured data analysis system 100. For example, the electronic device 200 accesses one or more other systems (e.g., server 310) using an application programming interface (API) call through the structured data analysis system 100, so as to initiate and execute a target task. In this embodiment, the electronic device 200 may be, for example, a mobile phone, a tablet computer, a notebook computer, a desktop computer, etc.

In this embodiment, the server 310 performs corresponding operations according to received data (e.g., output data DOUT) to realize the target task requested by the electronic device 200 and the structured data analysis system 100.

In this embodiment, the structured data analysis system 100 may include a processor 110 and a memory 120. In this embodiment, the memory 120 may store original field data D4' from the field completion analysis system 320, each adapter, and each module and related algorithm mentioned in each of the embodiments of the disclosure, and it may also store calculation software and other related algorithms, software, and data for realizing the conversion function of the structured data of the disclosure. The memory 101 may be, for example, a dynamic random access memory (DRAM), a lash memory, or a non-volatile random access memory (NVRAM), and the disclosure is not limited thereto.

In this embodiment, the processor 110 accesses data in memory 120, each adapter and each module, data transmitted between the electronic device 200 (e.g., input data DIN), data transmitted between the field completion analysis system 320 (e.g., missing collection D4 and original field data D4'), and data transmitted between the server 310 (e.g., output data DOUT). The processor may be, for example, a signal converter, a field programmable gate array (FPGA), a central processing unit (CPU), or other programmable general-purpose or special-purpose microprocessor, a digital signal processor (DSP), a programmable controller, an application specific integrated circuits (ASIC), a programmable logic device (PLD), other similar devices or a combination of the above devices, which may load and execute computer program-related firmware or software for implementing functions such as computing, data structuring, and executing.

In this embodiment, the field completion analysis system 320 stores the original field data D4' such as multiple fields related to computer software and field completion methods. In this embodiment, the field completion analysis system 320 may be, for example, a database.

Figure 2:
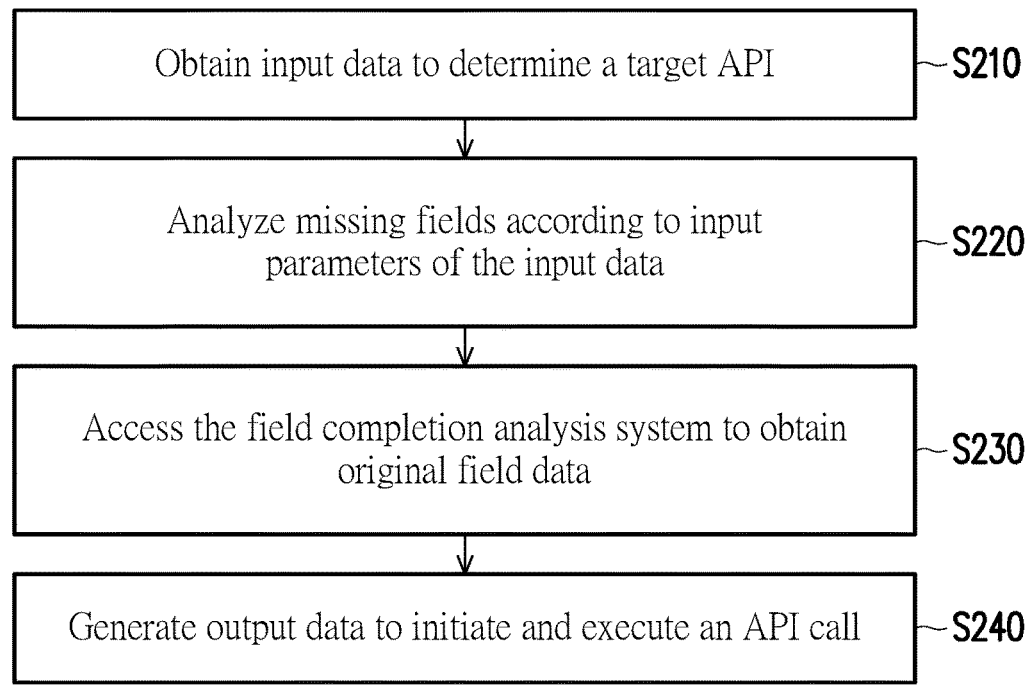
FIG. 2 is a flowchart of a method for structured data analysis according to an embodiment of the disclosure.

FIG. 2 is a flowchart of a method for structured data analysis according to an embodiment of the disclosure, with reference to FIG. 2 together, the structured data analysis system 100 may execute steps S210 to S240. The sequence of the steps S210 to S250 is just an example and is not limited thereto.

In step S210, the processor 110 obtains the input data DIN from the electronic device 200 to determine a target API for executing an API call. The input data DIN may be used as a data source of the structured data analysis system 100 to indicate a call request corresponding to the target API. The call request may be, for example, a function described in a certain data format and specification.

In step S220, the processor 110 analyzes missing fields according to input parameters of the input data DIN to generate a missing judgment result. The input parameters of the input data DIN may be, for example, collection data represented by a node, and will be further explained in the subsequent embodiment. The case of missing field indicates whether the input data DIN is missing any field and is expressed by the missing judgment result.

In step S230, the processor 110 generates the missing collection D4 based on the missing judgment result, and the processor 110 accesses the field completion analysis system 320 according to the missing collection D4 to obtain the original field data D4' from the field completion analysis system 320. The missing collection D4 may include collection data judged to be missing. The original field data D4' may include one or more fields lost or missing in the collection data and a completion method for completing the missing fields.

In step S240, the processor 110 generates the output data DOUT according to the original field data D4' and the target API, so as to initiate and execute the API call. The output data DOUT may include the input data DIN and the completed data of the missing fields, so that the server 310 executes the API call based on the target API according to the completed input data DIN (i.e., output data DOUT). Thus, the structured data analysis system 100 may call the target API in response to various input data DIN by adaptively completing missing fields, so as to realize the target task requested by the electronic device 200.

Figure 3:
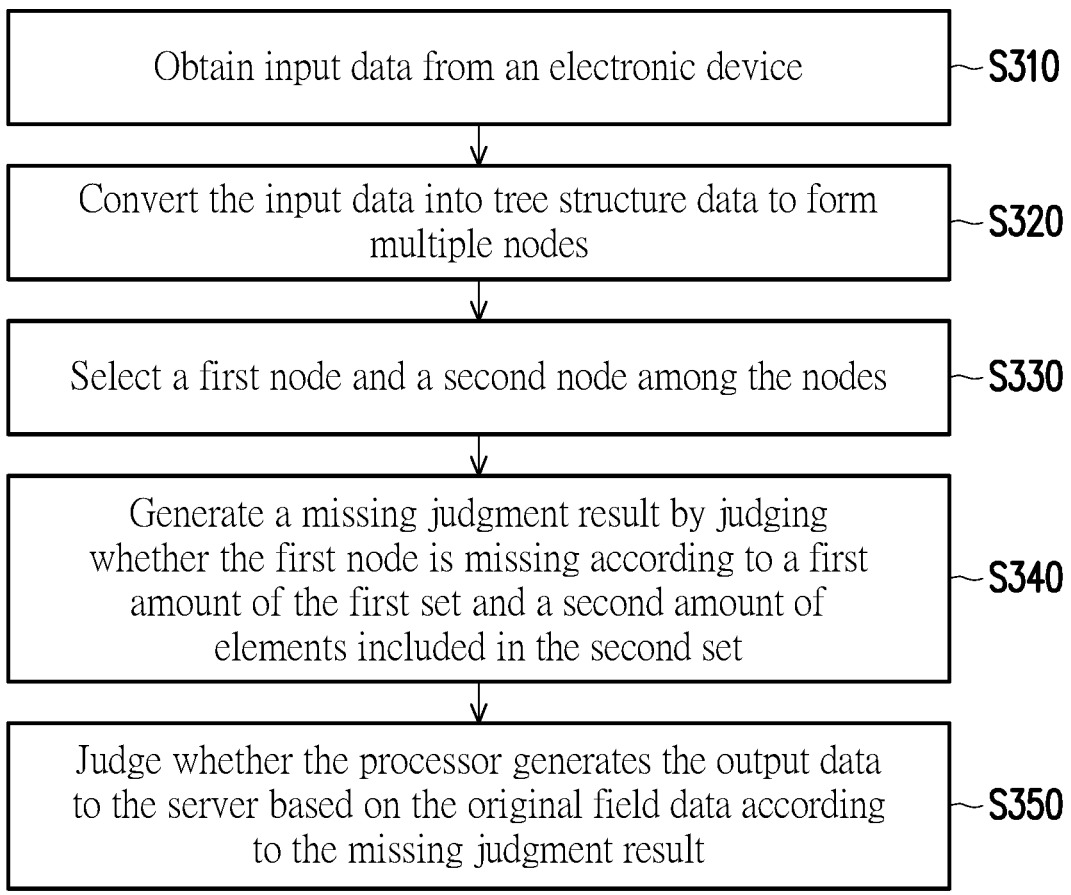
FIG. 3 is a flowchart of a method for structured data analysis according to an embodiment of the disclosure.

FIG. 3 is a flowchart of a method for structured data analysis according to an embodiment of the disclosure. Referring to FIG. 1 and FIG. 3, the structured data analysis system 100 may execute steps S310 to S350. The sequence of the steps S310 to S350 is just an example and is not limited thereto. In this embodiment, steps S310 to S350 may be applied to the following exemplary situations.

In this embodiment, the electronic device 200 executes the enterprise system to request the server 310 to execute an API call through the enterprise system to realize the target task. The target API for executing the API call has different data formats and specifications depending on the type and/or version of the target task. The electronic device 200 may check and analyze whether the target API is missing through the structured data analysis system 100 and complete the missing portion through the structured data analysis system 100, so that the completed target API may be correctly called by the server 310.

In step S310, the processor 110 obtains the input data DIN from the electronic device 200. For step S310, reference may be made to the related description of step S210 in FIG. 2.

Steps S320 to S340 may be, for example, the implementation details of step S220 in FIG. 2. Specifically, in step S320, the processor 110 converts the input data DIN into tree structure data to form multiple nodes. The nodes correspond to multiple collections in the input data DIN, respectively. That is, the processor 110 performs data structuring on the input data DIN to form the tree structure data. The tree structure data may include multiple nodes and line segments between the nodes. The node indicates a collection in the input data DIN describing the same attribute data. The line segment indicates the subordinate relationships among the collections, such as coupling relationships and/or logic relationships, etc.

In step S330, the processor 110 selects a first node and a second node among the nodes to analyze whether the selected first node is missing. The first node and the second node respectively correspond to a first collection and a second collection among the collections.

In step S340, the processor 110 generates a missing judgment result by judging whether the first node is missing according to a first amount of the first collection and a second amount of elements included in the second collection. The first amount of the first collection refers to times the first collection appears in the entire input data DIN. The second amount of the elements included in the second collection refers to the number of elements included in the second collection. In this embodiment, since the difference between the first amount and the second amount indicates whether the existence of the first collection matches an overall data structure in a hierarchical data structure. Thus, the difference may indicate the missing field of the first collection and is represented by the missing judgment result.

Step S350 may be, for example, the implementation details of steps S230 to S240 in FIG. 2. Specifically, in step S350, the processor 110 judges whether the processor 110 generates the output data DOUT to the server 310 based on the original field data D4' according to the missing judgment result. That is, in response to the missing judgment result indicates that the first collection being missing, the processor 110 judges that the processor needs to access the field completion analysis system 320 to complete the missing field based on the original field data D4' to generate the output data DOUT. On the other hand, in response to the missing judgment result indicates that the first collection not being missing, the processor 110 judges that the processor does not need to access the field completion analysis system 320, and the input data DIN is directly used as the output data DOUT. In some embodiments, the judgment flow of steps S340 to S350 may be repeatedly executed until all collections corresponding to the nodes complete the missing check and analysis.

In this embodiment, the server 310 operates according to the completed input data DIN (i.e., output data DOUT) to execute the API call based on the target API indicated by the input data DIN, thereby realizing the target task requested by the electronic device 200.

It is worth mentioning that the structured data analysis system 100 may automatically obtain the missing portion of the input data DIN (e.g., the first collection corresponding to the first node) by analyzing the input data DIN presented as tree structure data. Thus, the structured data analysis system 100 may improve the operation efficiency of the API call. In addition, the structured data analysis system 100 enables the server 310 to receive the correct API call request (i.e., output data DOUT) by automatically completing the missing portion to correctly execute the API call.

Figure 4:
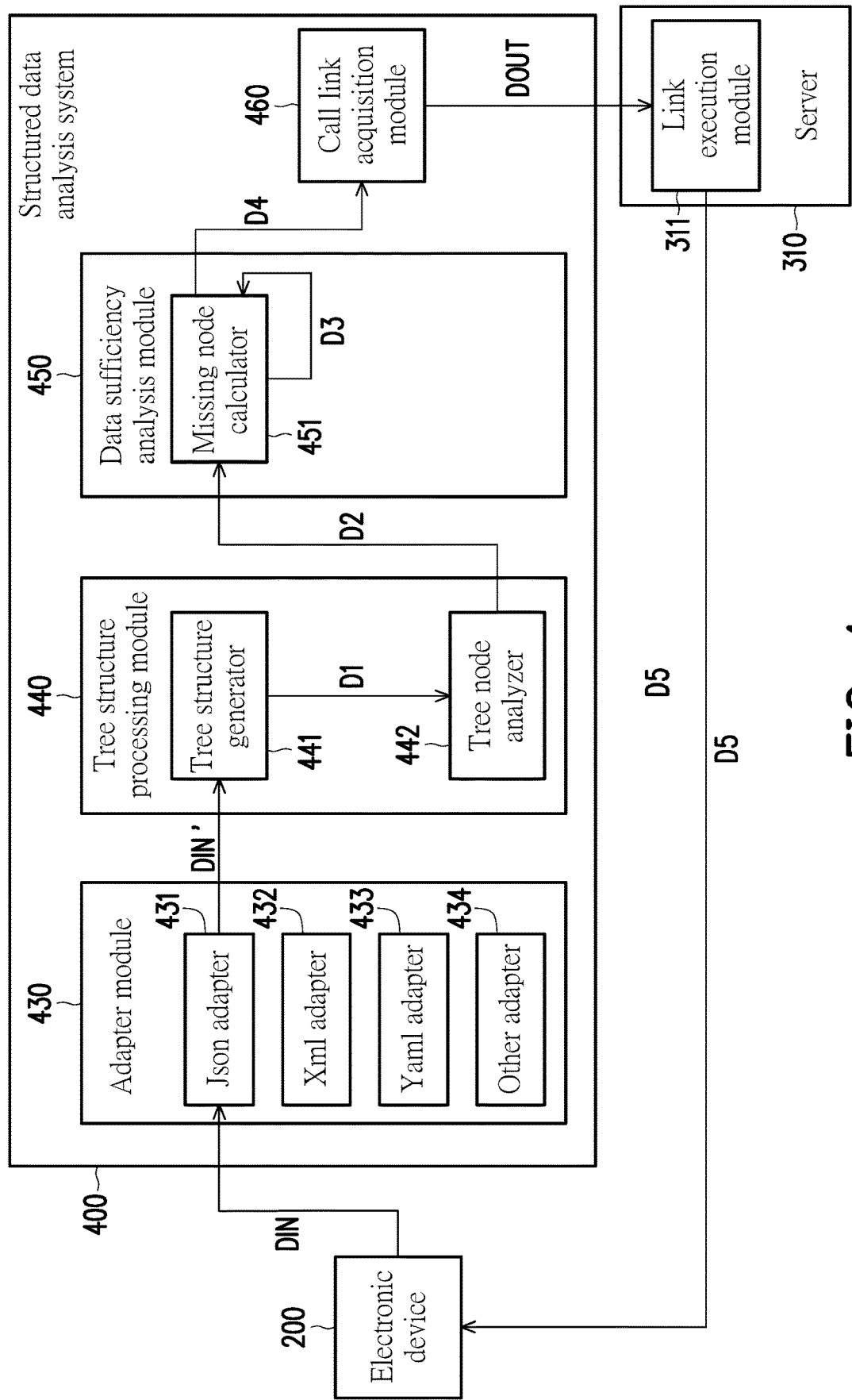
FIG. 4 is a circuit block diagram of a structured data analysis system according to another embodiment of the disclosure.

FIG. 4 is a circuit block diagram of a structured data analysis system according to another embodiment of the disclosure. Referring to FIG. 4, the structured data analysis system 400 may include an adapter module 430, a tree structure processing module 440, a data sufficiency analysis module 450, and a call link acquisition module 460 stored in the memory (not shown). The structured data analysis system 400 is coupled to the electronic device 200, the server 310, and a field completion analysis system (not shown). For the structured data analysis system 400, reference may be made to related descriptions of the structured data analysis system 100.

In this embodiment, the adapter module 430 may include multiple adapters 431~434. The adapters 431~434 may convert data and/or signal between different data formats. Specifically, the Json adapter 431 converts the data format of the input data DIN into a standard format of JavaScript objects (i.e., JavaScript Object Notation, JSON). The Xml adapter 432 converts the data format of the input data DIN into an extensible markup language (XML). The Yaml adapter 433 converts the data format of the input data DIN into a standard format of serialized data (i.e., Yaml). The other adapter 434 converts the data format of the input data DIN into a data format satisfying a hierarchical structure (e.g., CSON). The amounts and configurations of the adapters 431~434 of the embodiment shown in FIG. 4 are just examples and are not limited thereto.

In this embodiment, the tree structure processing module 440 may include a tree structure generator 441 and a tree node analyzer 442. The data sufficiency analysis module 450 may include a missing node calculator 451. The server 310 may include a link execution module 311.

Figure 5A:
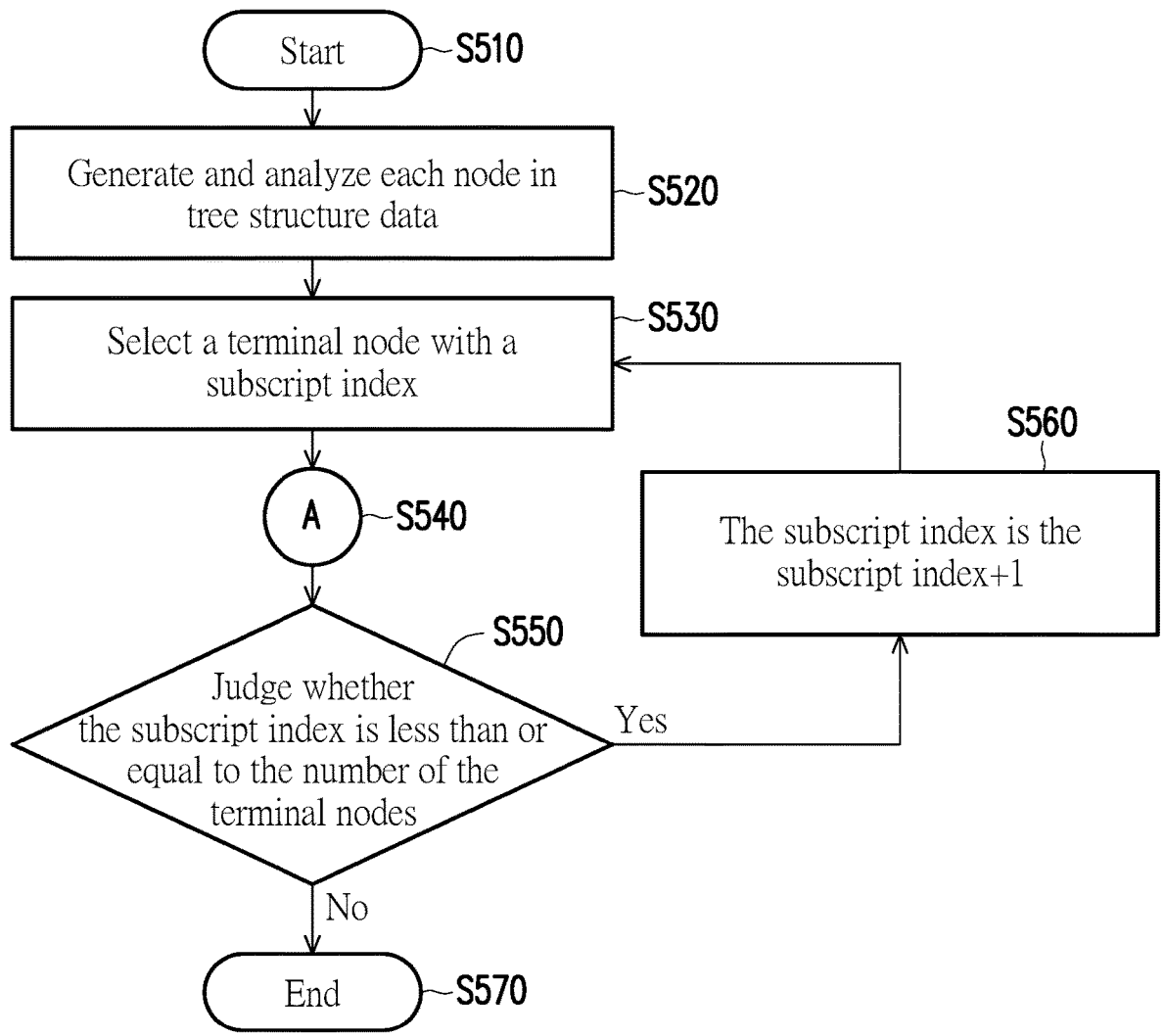
FIG. 5A to FIG. 5B are flowcharts of a method for structured data analysis according to another embodiment of the disclosure.
Figure 5B:
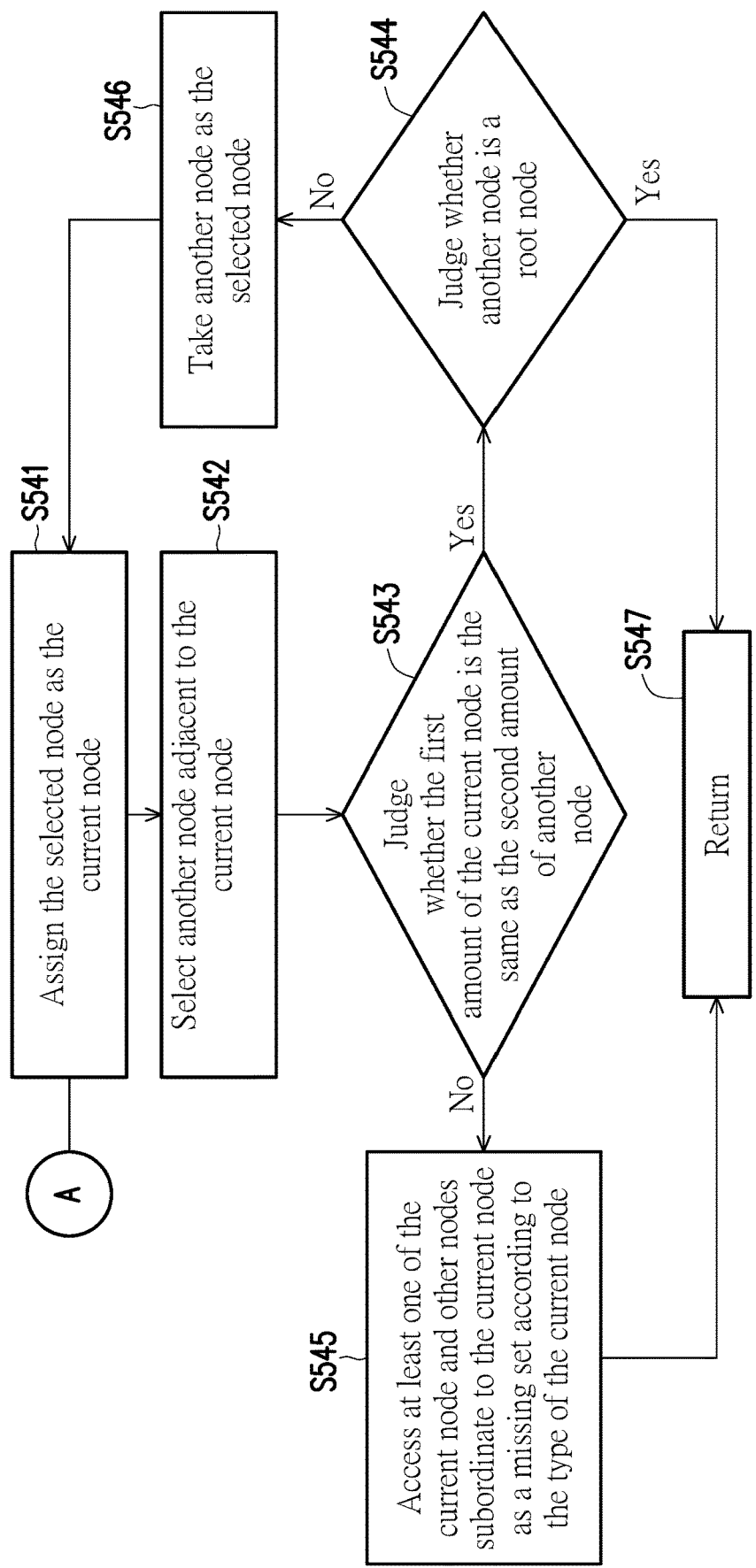

FIG. 5A to FIG. 5B are flowcharts of a method for structured data analysis according to another embodiment of the disclosure. Referring to FIG. 4 and FIG. 5A to FIG. 5B, the structured data analysis system 400 may execute steps S510~S570. The sequence of the steps S510 to S570 is just an example and is not limited thereto. In this embodiment, steps S510 to S570 may be applied to the following exemplary situations.

In this embodiment, the electronic device 200 executes the enterprise system to execute the task by using the API call through the enterprise system. The electronic device 200 generates the input data DIN for executing the target API.

In step S510, the structured data analysis system 400 starts to execute the method for structured data analysis. In detail, at least one of the adapters 431~434 (e.g., Json adapter 431) obtains the input data DIN from the electronic device 200. The Json adapter 431 converts the input data DIN into input data DIN' presented in a hierarchical data format (e.g., JSON).

Figure 6A:
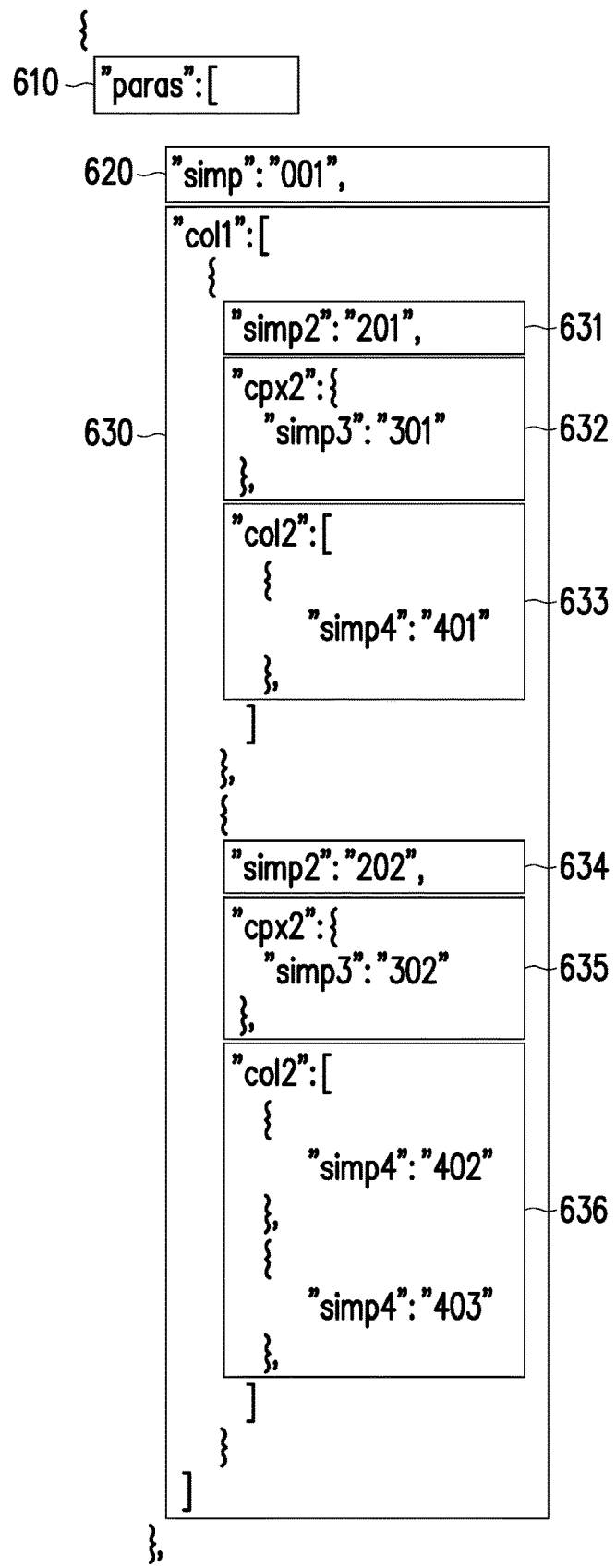

FIG. 6A to FIG. 6C are schematic diagrams of input data according to the embodiment of FIG. 4 of the disclosure, referring to FIG. 6A to FIG. 6C, the input data DIN' may include multiple elements and multiple collections formed by the elements, which are exemplarily shown in FIG. 6A to FIG. 6C. A collection may be, for example, a collection of concrete or abstract objects (i.e., element) having certain specific properties (or attributes). An element may be, for example, an input parameter of the input data DIN' to indicate API call operations such as adding, modifying, deleting, or querying.

In the embodiment of FIG. 6A, a portion of the input data DIN' includes a declaration denoted by "paras" in a box 610, an element denoted by "simp" in a box 620, and a collection denoted by "col1" in a box 630. In the box 630, a portion of the input data DIN' further includes an element denoted by "simp2" in boxes 631 and 634, a complicated collection denoted by "cpx2" in boxes 632 and 635, and a collection collection denoted by "col2" in boxes 633 and 636". The complicated collection denoted by "cpx2" includes an element denoted by "simp3", and the collection collection denoted "col2" includes an element denoted "simp4".

In the embodiment of FIG. 6B, another portion of the input data DIN' includes an element denoted by "simp" in a box 640 and a collection collection denoted by "col1" in a box 650. In the embodiment of FIG. 6C, other portion of the input data DIN' includes an element denoted by "simp" in a box 660 and a collection collection denoted by "col1" in a box 670. The elements and the collections in the embodiments of FIG. 6B and FIG. 6C may refer to the relevant descriptions of the embodiment of FIG. 6A.

It should be noted that the elements denoted by "simp", "simp2", "simp3", or "simp4" describes multiple characteristics of an attribute, so an element of this type is not a collection of simple values, but a collection of complicated structure. In this embodiment, the collections denoted by "col1", "col2", or "cpx2" describes multiple elements, so a collection of this type is also a collection of complicated structure.

In step S520, the processor executes the tree structure generator 441, so that the tree structure generator 441 converts the data structure of the input data DIN' to generate tree structure data D1. In addition, the processor executes the tree node analyzer 442, so that the tree node analyzer 442 analyzes each node in the tree structure data D1. The nodes correspond to multiple collections in the input data DIN', respectively. In detail, the tree structure generator 441 converts the input data DIN' into the tree structure data D1 to form multiple nodes. The tree structure generator 441 may, for example, convert the input data DIN' shown in FIG. 6A to FIG. 6C into the tree structure data D1 shown in FIG. 7.

Figure 7:
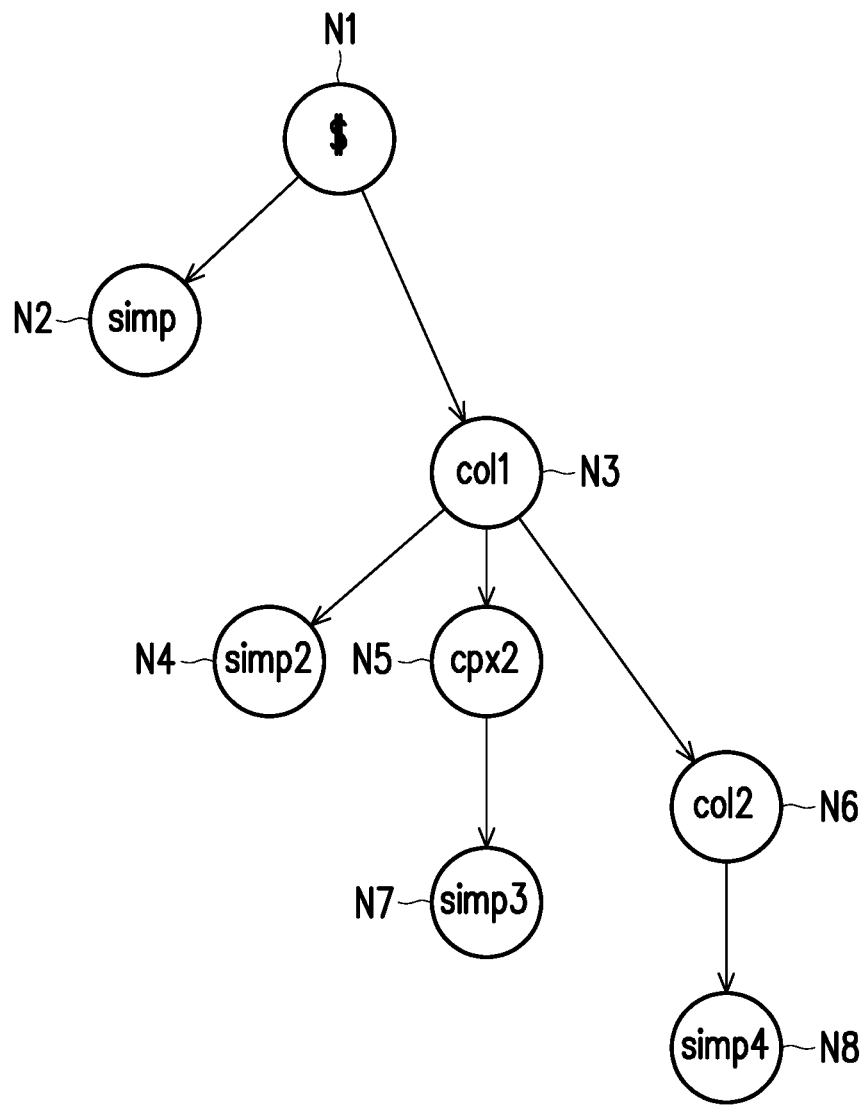
FIG. 7 is a schematic diagram of tree structure data according to the embodiment of FIG. 4 of the disclosure.

FIG. 7 is a schematic diagram of tree structure data according to the embodiment of FIG. 4 of the disclosure, with reference to FIG. 7 together, the tree structure data D1 may include multiple nodes N1~N8. The nodes N1~N8 may correspond to multiple collections in the boxes 610~670. For example, in the box 610, a declaration denoted by "paras" may be structured as a node N1. In the boxes 620, 640, and 660, the element denoted by "simp" may be structured as a node N2. In the boxes 630, 650, and 670, the collection denoted by "col1" may be structured as a node N3, the element denoted by "simp2" may be structured as a node N4, the collection denoted by "cpx2" may be structured as a node N5, the collection denoted by "col2" may be structured as a node N6, the element denoted by "simp3" may be structured as a node N7, and the element denoted by "simp4" may be structured as a node N8.

In this embodiment, referring to the tree structure data D1, the tree node analyzer 442 analyzes the types of the nodes N1~N8 and the subordinate relationships between the nodes N1~N8 according to the field information of the collections to generate analyze data D2. For example, the tree node analyzer 442 analyzes that the node N1 corresponding to this collection is a root node according to the field information denoted by "paras". The tree node analyzer 442 analyzes that the node N2 corresponding to this collection is a terminal node according to the field information denoted by "simp". By analogy, the nodes N4, N7, and N8 are also terminal nodes. The tree node analyzer 442 analyzes that the node N3 corresponding to this collection is a collection node according to the field information denoted by "col1". By analogy, the node N6 is also a collection node. The tree node analyzer 442 analyzes that the node N5 corresponding to this collection is a collection node (or a complicated node) according to the field information denoted by "cpx2".

It should be noted that a terminal node refers to a node that is coupled to a single node in the tree structure data. A terminal node may also be called a leaf node. A collection node or a complicated node refers to a node coupled with more than two nodes in the tree structure data and may cover one or more other nodes. The structured data analysis system 400 may select any terminal node (e.g., node N4) as a starting node of the checking operation. Each of the collection nodes (e.g., nodes N3, N1) in a branch in which the terminal node N4 is checked one by one until the root node N1 to complete the checking operation of a single branch.

Further to the above description, the tree node analyzer 442 further analyze according to the field information of the collections multiple first amounts of the collections respectively existing in the input data DIN' and multiple second amounts of elements respectively included in the collections to generate the analyze data D2. For example, referring to the input data DIN' and the tree structure data D1, for the node N3, the tree node analyzer 442 analyzes the field information denoted by "col1" to count the number of occurrences of this collection in the input data DIN' (i.e., the first amount is 3). In addition, the tree node analyzer 442 counts the number of elements included in this collection (i.e., the second amount is 6). The aforementioned number may be, for example, referring to the box 670 shown in FIG. 6C, the number of mantissas of the last element denoted by "'simp3': '306'".

For another example, for the node N6, the tree node analyzer 442 analyzes the field information denoted by "col2" to count the number of occurrences of this collection in the input data DIN' (i.e., the first amount is 6). In addition, the tree node analyzer 442 counts the number of elements included in this collection (i.e., the second amount is 9). The aforementioned number may be, for example, referring to the box 670 shown in FIG. 6C, the number of mantissas of the last element denoted by "'simp4': '409'".

In step S530, the processor executes the missing node calculator 451, so that the missing node calculator 451 selects a terminal node with a subscript index (i.e., nodes N2, N4, N7, or N8 shown in FIG. 7). The subscript index refers to the parameters for sorting the operations of each of the nodes in the tree structure data D1. In this embodiment, a terminal node with a subscript index of 1 may be, for example, the node N2, and so on. The missing node calculator 451 may select the terminal node N2. The missing node calculator 451 may execute step S540 starting from the terminal node N2 to check the node N2 and the node N1 upward in sequence in the direction of the root node N1 in the branch including the terminal node N2.

In step S540, the processor executes the missing node calculator 451, so that the missing node calculator 451 obtains the analyze data D2 provided by the tree node analyzer 442 and checks the missing status of each of the nodes in sequence according to the analyze data D2. In this embodiment, taking the missing node calculator 451 selecting the terminal node N4 as an example, the implementation details of step S540 are as follows.

In the embodiment of FIG. 5B, in step S541, the processor executes the missing node calculator 451, so that the missing node calculator 451 assigns the selected node (e.g., node N4) as a current node. That is, the missing node calculator 451 defines the currently checked node as the node N4.

In step S542, the processor executes the missing node calculator 451, so that the missing node calculator 451 selects another node N3 closest to and adjacent to the current node N4 in the direction of the root node N1 in the branch including the current node N4. That is, the selected current node N4 (i.e., the first node) and another selected node N3 (i.e., the second node) are located in the same branch. The nodes N4 and N3 are adjacently coupled and a subordinate relationship exists between the nodes N4 and N3.

In step S543, the processor executes the missing node calculator 451, so that the missing node calculator 451 judges whether the first amount of the current node N4 is the same as the second amount of another node N3. That is, the missing node calculator 451 compares the number of times the collection corresponding to the current node N4 exists in the input data DIN' (i.e., the first amount) and the number of elements included in the collection corresponding to another node N3 (i.e., the second amount) to generate a missing judgment result D3.

In response to the first amount and the second amount in step S543 being the same, it means that the element of the current node N4 may be included by the upstream node N3, and the element of the current node N4 matches the overall data structure of the input data DIN'. That is, the current node N4 is not missing, and it is indicated by a negative missing judgment result D3 (i.e., a negation of the missing judgment result D3). At this time, the missing node calculator 451 executes step S544.

In step S544, the processor executes the missing node calculator 451, so that the missing node calculator 451 judges whether another node N3 is a root node. That is, in response to the first amount and the second amount in step S543 being the same, the missing node calculator 451 generates the negative missing judgment result D3 to indicate that no field is missing in the current node N4. The missing node calculator 451 judges whether the missing node calculator 451 continues to check the missing fields in other nodes according to the type of another node N3 (i.e., root node or other node) based on the negative missing judgment result D3.

In response to the current node N4 being judged in step S544 not to be a root node, it means that there are unchecked nodes (e.g., nodes N3 and N1) in the branch. At this time, the missing node calculator 451 executes step S546.

In step S546, the processor executes the missing node calculator 451, so that the missing node calculator 451 takes another node N3 as the selected node and returns to step S541 to assign another node N3 as the new current node. In this embodiment, the missing node calculator 451 repeatedly executes steps S542 to S543 based on the current node N3 and another adjacent and subordinate node N1, and so on.

In response to the current node (e.g., node N1) being judged in step S544 to be a root node, it means that all nodes in the branch including the terminal node N4 have been checked. At this time, the missing node calculator 451 executes step S547 to return to step S550 in FIG. 5A.

That is, in an embodiment where the current node is node N4 and another node is node N3, the missing node calculator 451 may judge whether the missing node calculator 451 replaces the current node N4 with another node N3 as the new current node according to the type of another node N3 (i.e., root node or other node) based on the negative missing judgment result D3 to continue to judge whether the new current node (i.e., node N3) is missing, or stop checking and analyzing other nodes in the branch.

On the other hand, in response to the first amount and the second amount in step S543 not being the same, it means that the element of the current node (e.g., node N4) cannot be included by the upstream node N3, and the element of the current node N4 does not match with the overall data structure of the input data DIN'. That is, the current node N4 is missing, and it is indicated by a positive missing judgment result D3 (i.e., a confirmation of the missing judgment result D3). At this time, the missing node calculator 451 executes step S545.

For example, it is assumed that the "simp2" collection corresponding to the current node N4 exists in the input data DIN' for 2 times (i.e., the first amount), and the "col1" collection corresponding to another node N3 includes 3 (i.e., the second amount) elements. The "col1" collection includes 3 elements, but the "simp2" collection included in the "col1" collection only exists 2 times. Since the "simp2" collection corresponding to the current node N4 is incomplete, the field corresponding to the "simp2" collection is considered missing.

In step S545, the processor executes the missing node calculator 451, so that the missing node calculator 451 accesses at least one of the current node N4 and the other nodes N3 and N1 subordinate to the current node N4 as the missing collection D4 according to the type (i.e., terminal node or collection node) of the current node (e.g., node N4). Next, the missing node calculator 451 executes step S547 to return to step S550 in FIG. 5A.

In detail, in response to the first amount and the second amount in step S543 not being the same, the missing node calculator 451 generates a positive missing judgment result D3 to indicate that the current node (e.g., N4) has a missing field. In this embodiment, since the terminal node does not include other nodes, if the terminal node is missing, it means that only this terminal node is missing on this branch. That is, in response to the type of the current node N4 being a terminal node, the missing node calculator 451 accesses the current node N4 as the missing collection D4.

Further to the above description, since a collection node includes other collection nodes and/or terminal nodes, if a collection node is missing, it means that other nodes included by this collection node are also missing. That is, in response to the type of the current node (e.g., node N3) being a collection node, the missing node calculator 451 finds out the other node N4 subordinate to the current node N3 and accesses the current node N3 and the subordinate other node(s) N4 as the missing collection D4.

In the first case, it is assumed that the "simp" collection corresponding to the current node N2 exists in the input data DIN' for 2 times (i.e., the first amount), and the "paras" collection corresponding to another node N1 includes 3 (i.e., the second amount) elements. Since the first amount is not equal to the second amount, a node route including the root node N1 and the current node N2 is considered incomplete, and the field corresponding to the current node N2 on this node route is considered missing.

In the second case, it is assumed that the "cpx2" collection corresponding to the current node N5 exists in the input data DIN' for 5 times (i.e., the first amount), and the "col1" collection corresponding to another node N3 includes 6 (i.e., the second amount) elements. Since the first amount is not equal to the second amount, a node route including the root node N1, the node N3, and the current node N5 is considered incomplete, and the field corresponding to the current node N5 on this node route is considered missing. In addition, since the current node N5 is a collection node rather than a terminal node, the field corresponding to the downstream node N7 on this node route is also considered missing.

In the third case, it is assumed that the "simp4" collection corresponding to the current node N8 exists in the input data DIN' for 8 times (i.e., the first amount), and the "col2" collection corresponding to another node N6 includes 9 (i.e., the second amount) elements. Since the first amount is not equal to the second amount, a node route including the root node N1, the node N3, the node N6, and the current node N8 is considered incomplete, and the field corresponding to the current node N8 on this node route is considered missing.

In the fourth case, it is assumed that the "col1" collection corresponding to the current node N3 exists in the input data DIN' for 2 times (i.e., the first amount), and the "paras" collection corresponding to another node N1 includes 3 (i.e., the second amount) elements. Since the first amount is not equal to the second amount, a node route including the root node N1 and the current node N3 is considered incomplete, and the field corresponding to the current node N3 on this node route is considered missing. In addition, since the current node N3 is a collection node rather than a terminal node, the fields corresponding to all downstream nodes N4~N8 on this node route are also considered missing.

Returning to the embodiment in FIG. 4 and FIG. 5A, in step S550, the processor executes the missing node calculator 451, so that the missing node calculator 451 judges whether the subscript index of the currently selected terminal node is less than or equal to the number of all terminal nodes. That is, the missing node calculator 451 judges whether each of the branches in the tree structure data D1 has completed the operation of step S540.

In response to the current subscript index being not less than or equal to the number of all terminal nodes, it means that terminal nodes with other subscript indexes have not been selected for the missing check. At this time, the missing node calculator 451 executes step S560.

In step S560, the missing node calculator 451 updates the current subscript index to subscript index+1, and then repeatedly executes steps S530 to S550, so as to proceed to check the node(s) of another branch.

On the other hand, in response to the current subscript index being less than or equal to the number of all terminal nodes, it means that all terminal nodes have been selected and the missing check has been completed. At this time, the missing node calculator 451 executes step S570 to end the method for structured data analysis.

In this embodiment, in response to the missing node calculator 451 finishing checking all nodes to complete access to the missing collection D4, the call link acquisition module 460 obtains the missing collection D4 and the original field data (e.g., data D4' of the embodiment in FIG. 1). In this embodiment, the call link acquisition module 460 accesses the call link according to the missing collection D4 and the original field data to generate the output data DOUT. The call link may be, for example, the target API indicated by the input data DIN.

It should be noted that the output data DOUT is the data for which the completion operation has been performed on the missing collection D4 to indicate the execution of the target API call. That is, the output data DOUT may include the input data DIN and the completion data corresponding to the missing collection D4.

In this embodiment, the server 310 executes the link execution module 311, so that the link execution module 311 executes the API call according to the output data DOUT to generate a link execution result D5. The link execution module 311 feedbacks the link execution result D5 to the electronic device 200 to complete the target API call.

To sum up, the structured data analysis system and the method for structured data analysis of the disclosure may automatically judge the missing collection of the input data by analyzing the input data structured into tree structure data. Thus, the structured data analysis system may improve the operation efficiency of the API call. In addition, the structured data analysis system generates output data that may execute the target API call by automatically completing the missing collection, so that the server may correctly execute the API call based on the correct API call request.

Finally, it should be noted that the above embodiments are only used to illustrate the technical solutions of the disclosure and are not intended to limit it. Although the disclosure has been described in detail with reference to the above embodiments, persons of ordinary skill in the art should understand that they may still modify the technical solutions described in the above embodiments, or replace some or all of the technical features therein with equivalents, and that such modifications or replacements of corresponding technical solutions do not substantially deviate from the scope of the technical solutions of the embodiments of the disclosure.

What is claimed is:

1. A structured data analysis system, comprising:
a memory, configured to store original field data; and
a processor, coupled to the memory and a server, configured to obtain input data from an electronic device, and configured to convert the input data into tree structure data to form a plurality of nodes, wherein the nodes correspond to a plurality of collections in the input data, respectively,
wherein the processor is further configured to select a first node and a second node among the nodes, wherein the first node and the second node respectively correspond to a first collection and a second collection among the collections, and the processor is further configured to generate a missing judgment result by judging whether the first node is missing any field according to a first amount of the first collection and a second amount of elements included in the second collection and judge whether the processor generates output data to the server based on the original field data according to the missing judgment result to enable the server to operate according to the output data.

2. The structured data analysis system according to claim 1, wherein the first node and the second node are adjacently coupled and a subordinate relationship exists between the first node and the second node.

3. The structured data analysis system according to claim 1, wherein the processor is further configured to analyze according to field information of the collections, types of the nodes, subordinate relationships between the nodes, a plurality of first amounts of the collections respectively existing in the input data, and a plurality of second amounts of elements respectively included in the collections.

4. The structured data analysis system according to claim 1, wherein the processor is further configured to compare the first amount and the second amount, so that the processor generates a negation of the missing judgment result in response to the first amount and the second amount being the same, and based on the negation of the missing judgment result, the processor judges whether the processor replaces the first node with the second node according to a type of the second node to continue to judge whether the second node is missing any field.

5. The structured data analysis system according to claim 1, wherein the processor is further configured to compare the first amount and the second amount, so that the processor generates a confirmation of the missing judgment result in response to the first amount and the second amount not being the same, and based on the confirmation of the missing judgment result, the processor accesses at least one of the first node and other nodes subordinates to the first node as a missing collection according to a type of the first node.

6. The structured data analysis system according to claim 5, wherein the processor accesses the first node as the missing collection in response to the type of the first node being a terminal node.

7. The structured data analysis system according to claim 5, wherein the processor accesses the first node and the other nodes subordinate to the first node as the missing collection in response to the type of the first node being a collection node.

8. The structured data analysis system according to claim 5, wherein the output data comprises completion data corresponding to the missing collection.

9. The structured data analysis system according to claim 5, wherein the processor is further configured to access a call link according to the missing collection and the original field data to generate the output data.

10. The structured data analysis system according to claim 1, wherein the server executes an application programming interface call according to the output data.

11. A method for structured data analysis, comprising:
obtaining, through a processor of a server, input data from an electronic device;
converting, through the processor, the input data into tree structure data to form a plurality of nodes, wherein the nodes correspond to a plurality of collections in the input data, respectively;
selecting, through the processor, a first node and a second node among the nodes, wherein the first node and the second node respectively correspond to a first collection and a second collection among the collections;
generating, through the processor, a missing judgment result by judging whether the first node is missing any field according to a first amount of the first collection and a second amount of elements included in the second collection; and
judging, through the processor, whether the processor generates output data to the server based on original field data according to the missing judgment result to enable the server to operate according to the output data.

12. The method for structured data analysis according to claim 11, wherein the first node and the second node are adjacently coupled and a subordinate relationship exists between the first node and the second node.

13. The method for structured data analysis according to claim 11, further comprising:
analyzing, through the processor, according to field information of the collections, types of the nodes, subordinate relationships between the nodes, a plurality of first amounts of the collections respectively existing in the input data, and a plurality of second amounts of elements respectively included in the collections.

14. The method for structured data analysis according to claim 11, wherein generating, through the processor, the missing judgment result by judging whether the first node is missing any field according to the first amount of the first collection and the second amount of elements included in the second collection comprises:
comparing, through the processor, the first amount and the second amount; and
generating, through the processor, a negation of the missing judgment result in response to the first amount and the second amount being the same,
wherein judging, through the processor, whether the processor generates output data to the server based on the original field data according to the missing judgment result comprises:
judging, through the processor based on the negation of the missing judgment result, whether the processor replaces the first node with the second node according to a type of the second node to continue to judge whether the second node is missing any field.

15. The method for structured data analysis according to claim 11, wherein generating, through the processor, the missing judgment result by judging whether the first node is missing any field according to the first amount of the first collection and the second amount of elements included in the second collection comprises:
comparing, through the processor, the first amount and the second amount; and
generating, through the processor, a confirmation of the missing judgment result in response to the first amount and the second amount not being the same,
wherein judging, through the processor, whether the processor generates output data to the server based on the original field data according to the missing judgment result comprises:
accessing, through the processor based on the confirmation of the missing judgment result, at least one of the first node and other nodes subordinates to the first node as a missing collection according to a type of the first node.

16. The method for structured data analysis according to claim 15, wherein accessing, through the processor based on the confirmation of the missing judgment result, at least one of the first node and the other nodes subordinates to the first node as the missing collection according to the type of the first node comprises:
accessing, through the processor, the first node as the missing collection in response to the type of the first node being a terminal node.

17. The method for structured data analysis according to claim 15, wherein accessing, through the processor based on the confirmation of the missing judgment result, at least one of the first node and the other nodes subordinates to the first node as the missing collection according to the type of the first node comprises:
accessing, through the processor, the first node and the other nodes subordinate to the first node as the missing collection in response to the type of the first node being a collection node.

18. The method for structured data analysis according to claim 15, wherein the output data comprises completion data corresponding to the missing collection.

19. The method for structured data analysis according to claim 15, wherein judging, through the processor, whether the processor generates output data to the server based on the original field data according to the missing judgment result comprises:
accessing, through the processor, a call link according to the missing collection and the original field data to generate the output data.

20. The method for structured data analysis according to claim 11, further comprising:
executing, through the processor, an application programming interface call according to the output data.

* * * * *